(12) United States Patent
Kapinski et al.

(10) Patent No.: US 9,195,222 B2
(45) Date of Patent: Nov. 24, 2015

(54) SYSTEMS AND METHODS FOR EVALUATING STABILITY OF SOFTWARE CODE FOR CONTROL SYSTEMS

(71) Applicant: Toyota Motor Engineering & Manufacturing North America, Inc., Erlanger, KY (US)

(72) Inventors: James P. Kapinski, Redondo Beach, CA (US); Jyotirmoy V. Deshmukh, Torrance, CA (US)

(73) Assignee: Toyota Motor Engineering & Manufactruing North America, Inc., Erlanger, KY (US)

( * ) Notice: Subject to any disclaimer, the term of this patent is extended or adjusted under 35 U.S.C. 154(b) by 336 days.

(21) Appl. No.: 13/760,407

(22) Filed: Feb. 6, 2013

(65) Prior Publication Data

US 2014/0201723 A1    Jul. 17, 2014

Related U.S. Application Data

(60) Provisional application No. 61/752,768, filed on Jan. 15, 2013.

(51) Int. Cl.
  *G05B 13/02* (2006.01)
  *G06F 11/36* (2006.01)
  *B60T 8/1755* (2006.01)

(52) U.S. Cl.
  CPC .............. *G05B 13/02* (2013.01); *B60T 8/17551* (2013.01); *G06F 11/3608* (2013.01); *B60T 2270/86* (2013.01)

(58) Field of Classification Search
  None
  See application file for complete search history.

(56) References Cited

U.S. PATENT DOCUMENTS

| 6,370,467 | B1 | 4/2002 | Kimbrough |
| 6,845,471 | B1 * | 1/2005 | Huth ............................... 714/39 |
| 8,745,588 | B2 * | 6/2014 | Kawashima et al. .......... 717/124 |
| 2004/0015933 | A1 * | 1/2004 | Campos et al. ............... 717/160 |
| 2004/0030420 | A1 * | 2/2004 | Ulyanov et al. .................. 700/48 |
| 2004/0220786 | A1 * | 11/2004 | Tiwari et al. ...................... 703/2 |
| 2006/0293817 | A1 * | 12/2006 | Hagiwara et al. ............... 701/40 |

(Continued)

OTHER PUBLICATIONS

Prajna, Stephen, Antonis Papachristodoulou, and Fen Wu. "Nonlinear control synthesis by sum of squares optimization: A Lyapunov-based approach." Control Conference, 2004. 5th Asian. vol. 1. IEEE, 2004.*

(Continued)

*Primary Examiner* — Matthew Brophy
(74) *Attorney, Agent, or Firm* — Dinsmore & Shohl LLP

(57) ABSTRACT

In one embodiment, a method of evaluating stability of software code for a control system includes receiving a set of initial trajectories by a semidefinite programming solver module, and determining one or more candidate Lyapunov functions based on the set of initial trajectories. The method further includes performing a plurality of simulations using a model of the control system to create a set of discovered trajectories, and evaluating the set of discovered trajectories to determine one or more counterexample trajectories that violate one or more Lyapunov conditions. If one or more counterexample trajectories are discovered, then the method includes inputting the set of discovered trajectories including the one or more counterexample trajectories into the semidefinite programming solver module, and determining, by the semidefinite programming solver module, one or more additional candidate Lyapunov functions from the set of initial trajectories and the set of discovered trajectories.

20 Claims, 3 Drawing Sheets

(56) References Cited

U.S. PATENT DOCUMENTS

| | | | |
|---|---|---|---|
| 2009/0094004 A1* | 4/2009 | Sankaranarayanan et al. ... | 703/2 |
| 2011/0112659 A1* | 5/2011 | Pachner et al. ................. | 700/29 |
| 2013/0091492 A1* | 4/2013 | Mizrahi ........................ | 717/124 |
| 2013/0218365 A1* | 8/2013 | Caveney et al. ................. | 701/1 |

OTHER PUBLICATIONS

Tanaka, Kazuo, Tsuyoshi Hori, and Hua O. Wang. "A multiple Lyapunov function approach to stabilization of fuzzy control systems." Fuzzy Systems, IEEE Transactions on 11.4 (2003): 582-589.*

Topcu, Ufuk, Andrew Packard, and Peter Seiler. "Local stability analysis using simulations and sum-of-squares programming." Automatica 44.10 (2008): 2669-2675.*

Walsh, Gregory C., Hong Ye, and Linda G. Bushnell. "Stability analysis of networked control systems." Control Systems Technology, IEEE Transactions on 10.3 (2002): 438-446.*

Zhang, Wei, Michael S. Branicky, and Stephen M. Phillips. "Stability of networked control systems." Control Systems, IEEE 21.1 (2001): 84-99.*

Vandenberghe et al, Semidefinite Programming. SIAM Review, 38(1):49-95, Mar. 1996.

R. Alur et al, Automatic symbolic verification of embedded systems. IEEE Transactions on Software Engineering, 22(3):181-201, Mar. 1996.

Ball et al, Slam and static driver verifier: Technology transfer of formal methods inside microsoft. In Integrated Formal Methods, vol. 2999 of Lecture Notes in Computer Science, pp. 1-20. Springer Berlin Heidelberg, 2004.

Boyd et al, Linear Matrix Inequalities in System and Control Theory, vol. 15 of SIAM Studies in Applied Mathematics. SIAM, 1994.

Branicky, Multiple lyapunov functions and other analysis tools for switched and hybrid systems. IEEE Transactions on Automatic Control, 43(4):475-482, Apr. 1998.

Parrilo, Structured Semidefinite Programs and Semialgebraic Geometry Methods in Robustness arid Optimization. PhD thesis, California Institute of Technology, 2000.

Henzinger et al, What's Decidable about Hybrid Automata? Journal of Computer and System Sciences, pp. 373-382, 1995.

Sturm, Using SeDuMi 1.02, A MATLAB Toolbox for Optimization over Symmetric Cones. Optimization Methods arid Software, 11/12(1-4):625-653, 1999.

Loferg, Johan, YALMPI: A toolbox for modeling and optimization in MATLAB. In Proceedings of the CACSD Conference, Taipei, Taiwan, 2004.

Topcu et al, Local stability analysis using simulations and sum-of-squares programming. Autornatica, 44:2669-2675, 2008.

* cited by examiner

SYSTEMS AND METHODS FOR EVALUATING STABILITY OF SOFTWARE CODE FOR CONTROL SYSTEMS

CROSS-REFERENCE TO RELATED APPLICATIONS

This application claims the benefit of U.S. Provisional Patent Application Ser. No. 61/752,768 entitled "SYSTEMS AND METHODS FOR EVALUATING STABILITY OF SOFTWARE CODE FOR CONTROL SYSTEMS," filed Jan. 15, 2013, the entire disclosure of which is hereby incorporated by reference herein.

TECHNICAL FIELD

The present specification generally relates to methods for evaluating stability of software code for control systems and, more particularly, methods for evaluating stability of software code for control systems using semidefinite programming techniques and Lyapunov functions.

BACKGROUND

Model-based design (MBD) is increasingly being used to develop embedded control systems for automotive applications. MBD provides a framework under which system design specifications and performance models may be created and automatic code generation, calibration, and integrated testing may be performed. Proper tools for performing MBD activities may be required to ensure an efficient, effective development process that satisfies software quality and operational standards. Techniques for evaluating embedded controller designs developed during the MBD process may include simulation, hardware in-the-loop (HIL) testing, and calibration. Improving the efficiency and effectiveness of these testing activities is important, since they account for a significant portion of the system design and deployment cost. Additionally, the tests directly affect product performance measures, such as quality, and efficiency. Despite this, methods for performing these tests are often ad hoc and usually lack formal specifications against which an engineer may test.

Difficulties contributing to the deficiencies in testing procedures are a consequence of the natural intractability of the verification task for real-time control systems. While techniques such as model checking have successfully been applied to computer hardware to verify correct operation, verification of real-time control systems (e.g., for automotive applications) has been shown to be undecideable; that is, is has been proven that no computer algorithm can solve the general problem of verifying correct operation of a real-time computer control system.

Techniques, however, do exist for proving properties of real-time control systems for specific cases. Lyapunov techniques can prove certain correctness properties for dynamical systems. Such Lyapunov notions can be applied to real-time control systems, but they are only tractable for special classes of systems and can only be applied at the earliest stages of the MBD process (e.g., the initial design or specification stage). Accordingly, it may be advantageous to be able to apply such techniques to the later stages of the MBD process. This type of analysis would increase confidence in the correctness of the design and increase the efficiency of the testing process, thereby reducing cost, and decreasing the possibility of errors in the control design (resulting in a decreased chance of quality problems and safety issues).

SUMMARY

In one embodiment, a method of evaluating stability of software code for a control system includes receiving a set of initial trajectories, and determining, by the semidefinite programming solver module, one or more candidate Lyapunov functions based on the set of initial trajectories. The method further includes performing a plurality of simulations using a model of the control system to create a set of discovered trajectories, and evaluating the set of discovered trajectories to determine one or more counterexample trajectories that violate one or more Lyapunov conditions. If one or more counterexample trajectories are discovered, then the method includes inputting the set of discovered trajectories including the one or more counterexample trajectories into the semidefinite programming solver module, and determining, by the semidefinite programming solver module, one or more additional candidate Lyapunov functions from the set of initial trajectories and the set of discovered trajectories.

In another embodiment, a computer-program product for use with a computing device for evaluating stability of software code for a control system includes a computer-readable medium storing computer-executable instructions that, when executed by the computing device, cause the computing device to receive a set of initial trajectories, and determine one or more candidate Lyapunov functions based on the set of initial trajectories using a semidefinite programming solver module. The computer-executable instructions further cause the computing device to perform a plurality of simulations using a model of the control system to create a set of discovered trajectories, and evaluate the set of discovered trajectories to determine one or more counterexample trajectories that violate one or more Lyapunov conditions. If one or more counterexample trajectories are discovered, the computer-executable instructions further cause the computing device to input the set of discovered trajectories including the one or more counterexample trajectories into the semidefinite programming solver module, and to determine one or more additional candidate Lyapunov functions based on the set of initial trajectories and the set of discovered trajectories.

In yet another embodiment, a method of evaluating stability of software code for a control system includes receiving a set of initial trajectories, and determining, by a semidefinite programming solver module, one or more candidate Lyapunov functions based on the set of initial trajectories. The method further includes performing a plurality of simulations of the control system to create a set of discovered trajectories, and evaluating the set of discovered trajectories to determine one or more counterexample trajectories that violate one or more Lyapunov conditions. If no candidate Lyapunov functions are found, the method further includes indicating instability of the software code. If one or more counterexample trajectories are discovered, the method further includes inputting the set of discovered trajectories including the one or more counterexample trajectories into the semidefinite programming solver module, and determining, by the semidefinite programming solver module, one or more additional candidate Lyapunov functions based on the set of initial trajectories and the set of discovered trajectories. If no counterexample trajectories are discovered, the method further includes performing a convex optimization on the set of initial trajectories and the set of discovered trajectories to determine an invariant set of trajectories.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the appended figures, embodiments of the present disclosure are directed to techniques for proving correctness properties for dynamical systems, such as embedded controller designs. More particularly, embodiments of the present disclosure may be used by designers using model-based design tools to evaluate software and control systems late in the design stage. Embodiments systemically infer system specifications in the form of Lyapunov functions from existing system designs. The inferred specifications are used during the testing phase to determine whether the system adheres to the stability properties present in the original design. Accordingly, the methods described herein address the problems of lack of stability specifications by system designers and the legacy code problem, where a system design is used from a previous product design cycle and the documentation of the system requirements from the previous cycle was not available or was not retained. Further, by use of Lyapunov functions and global optimization techniques, embodiments systematically search for undesirable system behaviors, which may assist calibration and test engineers in identifying undesirable system behaviors. This may increase the reliability of the system design and may decrease the costs related to testing. Various embodiments of semidefinite programming methods for software validation and debugging will be described in more detail herein.

Lyapunov analysis techniques may be used to verify stability of dynamical systems. However, traditionally Lyapunov techniques require an analytic model of the system dynamics and usually cannot be applied to detailed system models, such as control block-diagram models used for automatic code generation and unit testing (model-based design, "MBD"). Unlike previous Lyapunov techniques, which are applied to the early stages of the control design process, embodiments of the present disclosure leverage Lyapunov concepts in a manner that permits their use in the later stages of the MBD process. System designers may use MBD to automatically generate code that may be embedded in a control system, such as a vehicle control system.

Figure 1:
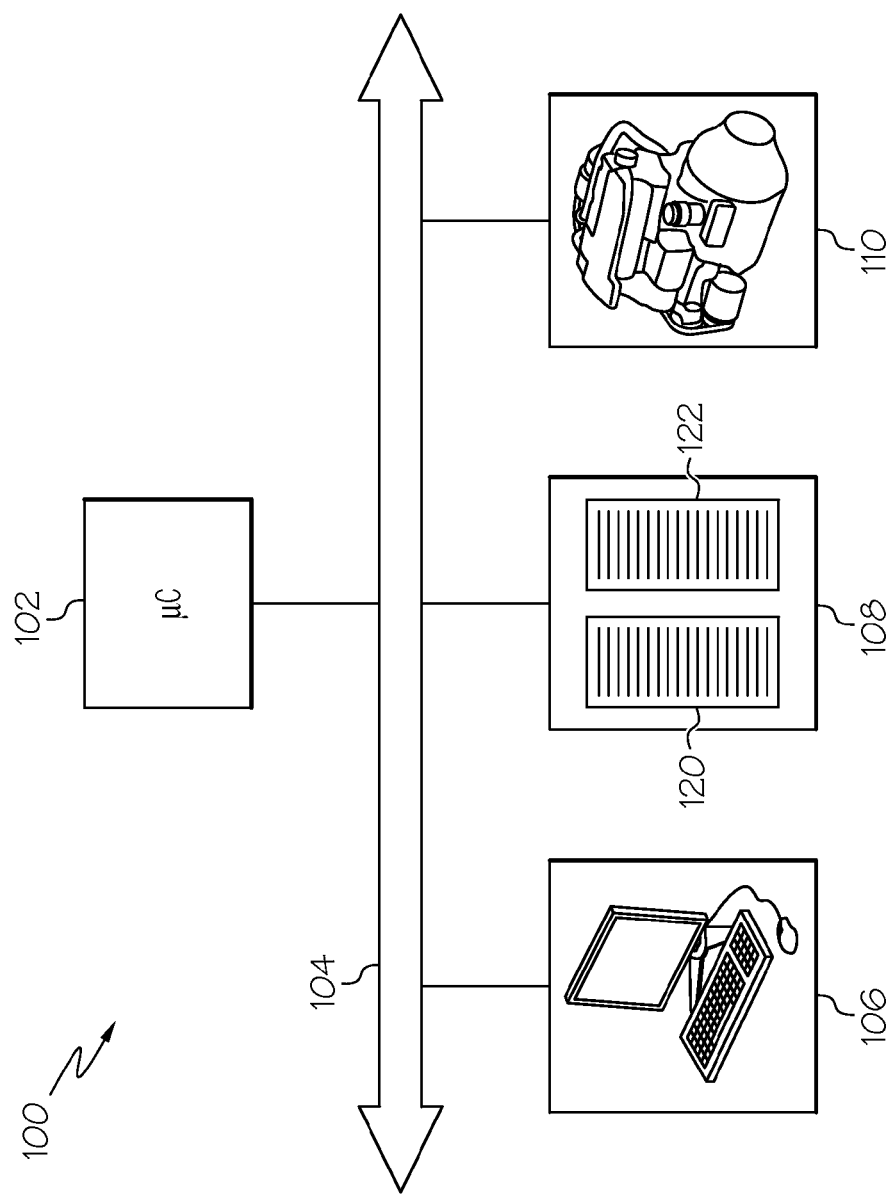
FIG. 1 schematically depicts a computing device configured to determine the stability of software code for control systems using semidefinite programming as described and illustrated herein.

Referring now to FIG. 1, exemplary hardware components of a computing device 100 (or system) used to implement the methods described herein are schematically illustrated. It should be understood that embodiments are not limited to the components and the configuration depicted in FIG. 1, and that other components and configurations may be used. The computing device 100 may be configured as a general purpose computer or an application-specific computing device. The computing device 100 may be any computer capable of running MBD programs and semidefinite programming tools described herein.

Generally, the illustrated computing device 100 may be embodied as a separate computing device, a plurality of networked computing devices and/or a computer-program product comprising non-transitory computer-readable medium for evaluating software and control systems for stability and error detection, according to embodiments shown and described herein. It is noted that the computer-program products and methods for evaluating stability of software code for a control system may be executed by a computing device that is external to the illustrated computing device 100 in some embodiments. For example, a first computing device may be used for MBD purposes, while a second computing device may be used for debugging and evaluation purposes.

The example computing device 100 illustrated in FIG. 1 comprises a processor 102, input/output hardware 106, a non-transitory computer-readable medium 108 (which may store debugging data/logic 120 (including, but not limited to, the semidefinite programming solver module), and the software code 122 that is under evaluation, for example), and a plant representation 110 that is configured to simulate the actual system for which the software code is designed, such as a motor, a vehicle, an electronic braking system, and the like. It is noted that, in some embodiments, the computing device 100 may receive data from an actual physical plant (e.g., engine, vehicle) rather than, or in conjunction with, the computer simulated plant representation 110. Other components may also be provided, such as network hardware (e.g., modem, LAN port, wireless fidelity (Wi-Fi) card, WiMax card, mobile communications hardware, and/or other hardware for communicating with other networks and/or devices.).

The computer-readable medium 108 may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the computer-readable medium 108 may be configured to store, among other things, debugging data/logic 120 (e.g., semidefinite programming program(s), optimization program(s), and the like) and the software code 122 (e.g., a vehicle embedded software code), as described in more detail below. In some embodiments, the plant representation 110 may also be stored on the computer-readable medium 108, or externally from the computing device 100. A local interface 104 is also included in FIG. 1 and may be implemented as a bus or other interface to facilitate communication among the components of the computing device 100. As stated above, in some embodiments, the plant representation 110 may not be provided by computer simulation but rather an actual physical plant under evaluation (e.g., an engine, a vehicle, and the like).

The processor 102 may include any processing component(s) configured to receive and execute instructions (such as from the computer-readable medium 108). The input/output hardware 106 may include any hardware and/or software for providing input and receiving output to and from the computing device 100, such as, without limitation a keyboard, mouse, display, camera, microphone, speaker, touchscreen, and/or other device for receiving, sending, and/or presenting data.

It should be understood that the computer-readable medium 108 may reside local to and/or remote from the computing 100 and may be configured to store one or more pieces of data for access by the computing device 100 and/or other components. It should also be understood that the components illustrated in FIG. 1 are merely exemplary and are not intended to limit the scope of this disclosure. More specifically, while the components in FIG. 1 are illustrated as residing within a single computing device 100, this is a nonlimiting example. In some embodiments, one or more of the components may reside external to the computing device 100, such as within an external computing device that is communicatively coupled to one or more computing devices.

In many cases, aspects of the dynamical control system model (i.e., the "plant") under evaluation, such as a model of a vehicle, are either too complex (e.g., due to switching behavior) or are unknown (as in the case where no model exists for the plant and a real experimental system is used instead) and therefore cannot be analyzed using standard Lyapunov techniques, which use an explicit, mathematical representation of the system dynamics. The technique described below uses only system trajectories (obtained via either simulation or experiment) and so may be applied without an explicit, mathematical representation of the system dynamics. As described in more detail below, embodiments use trajectories of the dynamical system model (and/or data taken from a physical plant, such as an actual vehicle) as input into a semidefinite programming solver module to find one or more candidate Lyapunov functions. Trajectories, as used herein, are system behaviors generated by computer simulation and/or experimentation using a selected set of system parameters. In vehicle applications, the set of system parameters may include, but are not limited to, controller constants (e.g., controller feedback gain), physical constants (e.g., vehicle drag coefficient), and/or initial conditions (e.g., initial engine speed).

The one or more candidate Lyapunov functions are inputted into a global optimization process that uses the model of the control system to find one or more counterexample trajectories that violate one or more of the Lyapunov conditions. As used herein, the Lyapunov conditions are: (1) a positive definite function, and (2) a strictly decreasing function. The counterexample trajectories are then input into the semidefinite programming solver module, which is run again to find one or more Lyapunov functions. If no Lyapunov functions are ever found, the system may indicate that the software code is unstable, or has software bugs. If no counterexample trajectories are found, then the system may either indicate that the software is substantially stable and/or substantially free of software bugs with a high degree of confidence. In some embodiments, the system may further determine an invariant set that defines an area of operation that is substantially stable.

Figure 2:
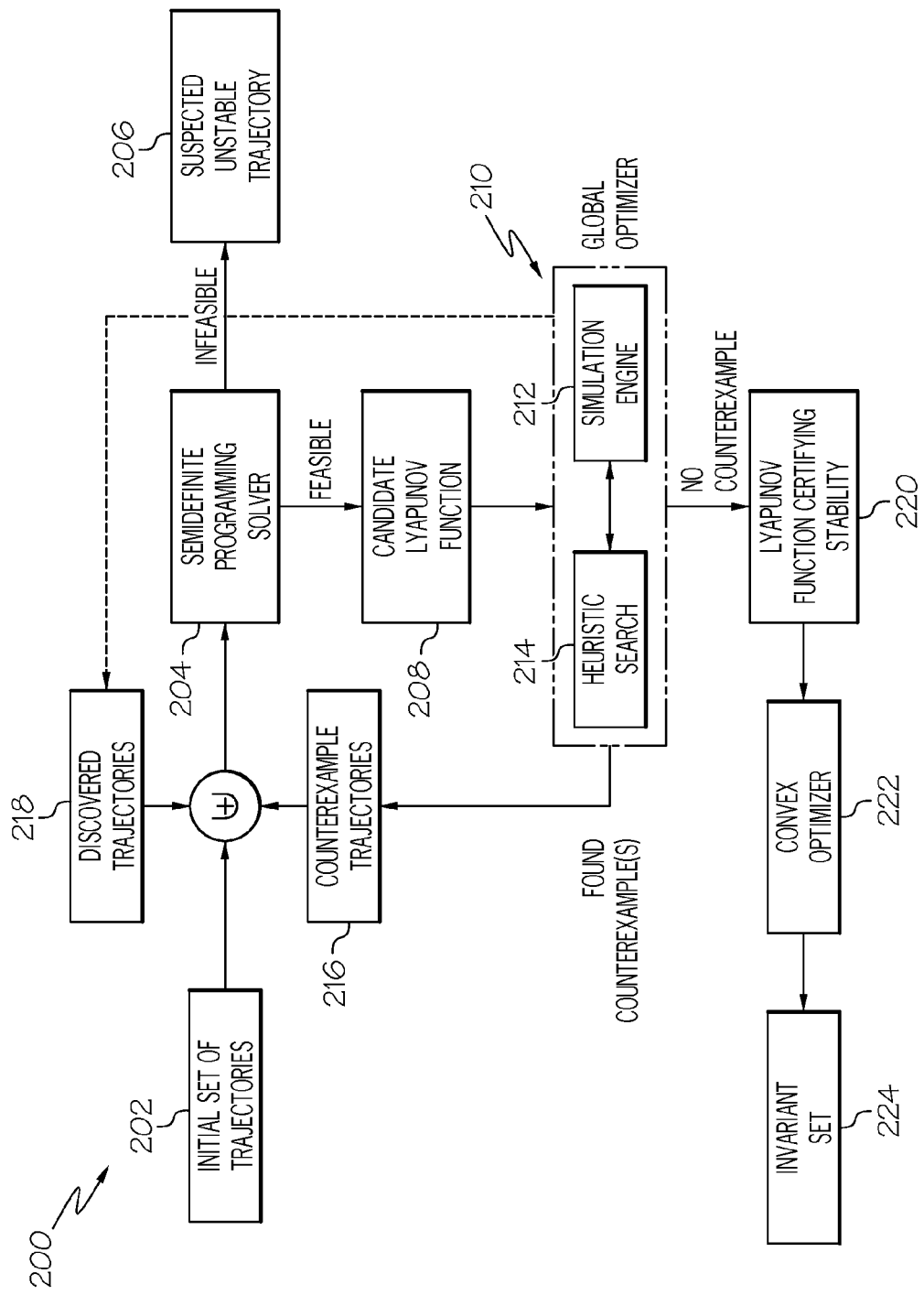
FIG. 2 depicts a flowchart of an exemplary method for evaluating the stability of software code for control systems using semidefinite programming as described and illustrated herein.

Referring now to FIG. 2, a flowchart 200 depicting an exemplary method for evaluating the stability of software code for a control system is depicted. The input is a region within the continuous state-space of the dynamical control system that the designer wishes to verify as being substantially free of unstable behaviors. An initial set of trajectories are provided at block 202. The initial set of trajectories may include simulation traces received from the simulation engine 212, which may represent simulations based on a range of values for various system parameters of interest. As an example and not a limitation, the simulation engine, using the plant representation 110, may provide trajectories based on an engine that is run from 0 revolutions per minute ("RPM") to 3000 RPM over a particular period of time and at particular ambient temperature. The simulation engine may provide outputs regarding any number of parameters based on any number of inputs. Initial trajectories may be selected by selecting specific system parameters, and then demonstrating the system behaviors using the selected parameters. These trajectories may be used as the initial set of trajectories at block 202. It is noted that the simulation engine 212 may use computer simulated trajectories and/or experimental trajectories taken from a physical plant.

The initial set of trajectories is then inputted into a semidefinite programming solver module at block 204. Semidefinite programming is an optimization technique that may be used to address several problems in control design. Semidefinite programming may be used in the optimization of complex systems. The semidefinite programming solver module described herein may be any software package capable of the optimization techniques described herein and may include, but are not limited to, the SeDuMi and YALMIP optimization packages for MATLAB® by MathWorks®.

More specifically, as an example and not a limitation, the semidefinite programming problem solved by the semidefinite programming solver module may be expressed as follows: Let $x(k)$ for $k \in \{1, \ldots, K\}$ be a trace of the system, where $x(k) \in \mathbb{R}^n$. Let $z(k) \in \mathbb{R}^m$ be a vector of monomials in $x(k)$. For example, if $x(k)=[x_1(k)\ x_2(k)]^T$, then $z(k)$ can be $z(k)=[x_1(k)^2\ x_1(k)x_2(k)\ x_2(k)^4]^T$. Let $v(k)=z(k)^T P z(k)$. We take $P>0$ mean that P is positive definite, that is, for all $z(k) \neq 0$, $z(k)^T P z(k) > 0$. The semidefinite programming problem uses the following conditions, which are necessary conditions for the system to be Lyapunov stable:

$$P>0; \qquad (1)$$

$$v(k+1)-v(k)>0. \qquad (2)$$

Here, the elements of P are the decision variables for the semidefinite programming solver module. Note that (1) is a semidefinite programming constraint and (2) is a linear constraint. A plurality of constraints similar to (2) are included in each semidefinite programming problem, one for each $x(k)$, $x(k+1)$ pair of points from the collection of traces. The P that results from the semidefinite programming problem defines a Lyapunov candidate function $v(k)$.

At block 204, the semidefinite programming solver module formulates a search for a candidate Lyapunov function using the initial set of trajectories as input. The information from the initial set of trajectories is encoded as constraints that the Lyapunov candidate should satisfy. As stated above, the constraints demand that a potential Lyapunov function candidate satisfy the Lyapunov conditions: (1) that it is a positive definite function, and (2) that it is strictly decreasing.

The software code may be considered unstable if a Lyapunov function candidate is not found. Optionally, the process may move to block 206, where an indication that software code under evaluation may be unstable is provided (e.g., using a graphical user interface). If one or more candidate Lyapunov functions are found (block 208), they are input into a global optimizer at block 210. The global optimizer attempts to refute the one or more candidate Lyapunov functions. Counterexample trajectories are trajectories that violate the Lyapunov conditions. The global optimizer is defined as the simulation engine 212 and a heuristic search component 214 comprising a non-convex, global optimization process that searches for a simulation trajectory that violates the Lyapunov conditions with the one or more candidate Lyapunov functions. In other words, the simulation engine is run using the constraints provided by the one or more candidate Lyapunov functions.

The simulation engine 212 produces a set of discovered trajectories while searching for counterexample trajectories. If one or more counterexample trajectories are found, they are added to the initial set of trajectories at block 216. The set of discovered trajectories represented by block 218 are also added to the initial set of trajectories and the counterexample trajectories. The initial set of trajectories, the counterexample trajectories, and the discovered trajectories are inputted into the semidefinite programming solver module at block 204, which is run again to find one or more candidate Lyapunov functions based on the updated input. The process is repeated until either no candidate Lyapunov functions are found (block 206), or one or more candidate Lyapunov functions are found but no counterexample trajectories are found such that the process moves to block 220. The software code under evaluation may be deemed stable with increased confidence if one or more candidate Lyapunov functions are found but no counterexample trajectories are found. Optionally, an indication regarding the stability of the software code under evaluation may be provided at block 220.

More specifically, the global optimization problem may be formulated as follows:

$$\min_{x(k)} v(k+1) - v(k). \quad (3)$$

Here, the P was selected by the previous semidefinite programming solution, v(k) is evaluated at the point x(k) (i.e., the decision variable for the global optimization problem), and v(k+1) is evaluated at the point x(k+1), which is obtain either through simulation or experiment using x(k) as the initial condition. If the solution to (3) is less than zero, then the candidate Lyapunov function v(k) is rejected, and another semidefinite programming solution is generated.

Optionally, in some embodiments, the process includes the determination of an invariant set. An invariant set of the system is an area of interest wherein no trajectories that enter the invariant set will ever leave the invariant set. At block 222, a convex optimization is performed using the initial set of trajectories and the discovered set of trajectories to determine the invariant set. For example, the sum-of-squares technique may be used to determine the invariant set. Sum-of-squares techniques are an extension to semidefinite programming that provides a relaxation of the problem of proving the positiveness of a polynomial function. Because the form of the results of the Lyapunov analysis described herein are polynomial functions, the sum-of-squares may be used to approximate ideal sets of system behaviors (i.e., sets of system behaviors that are substantially guaranteed to exhibit stable system behavior).

More specifically, the global optimization solution maximizes the size of a candidate invariant set such that it remains fully within a region of interest (i.e., the region that the global optimizer searches over). The global optimization problem may be expressed as follows: Let $x \in \mathbb{R}^n$ be a vector of n indeterminate variables. Consider a region of interest defined by the unit ball $S = \{x | x^T x \leq 1\}$. Let $z \in \mathbb{R}^m$ be a vector of monomials in x (e.g., if $x = [x_1\ x_2]^T$, then z can be $z = [x_1^2\ x_1 x_2\ x_2^4]^T$). The candidate Lyapunov function given by the semidefinite programming solver module is then given by $v(x) = z^T P z$. Call the set of points $L = \{x | z^T P z \leq \gamma\}$ a sublevel set of size $\gamma$. A solution to the following convex optimization problem produces a lower bound on the maximum sublevel set size $\gamma$ such that the sublevel set is contained within S.

$$\max_{\gamma, \lambda} \gamma \quad (4)$$
$$\text{s.t.} \quad z^T P z - \gamma - \lambda(x^T x - 1) \in SoS$$
$$\lambda > 0$$

In (4), SoS is used to denote the set of Sum of Squares polynomials; the SoS constraint in (4) is known to be convex. The decision variable $\lambda \in \mathbb{R}$ is used to implement the S-procedure, which is a technique for guaranteeing that, for example, if $x^T x - 1 > 0$ then $z^T P z - \gamma > 0$ (in this case, this guarantees that the sublevel set is within the unit ball S). The optimization in (4) can be solved using a semidefinite programming solver (e.g., the semidefinite programming solver module in block 204 described above). The result is a sublevel set size $\gamma$, which is fully contained within S. This sublevel set is provided as the output Invariant Set.

A prototype of the process depicted in FIG. 2 was implemented in the MATLAB programming environment using SeDuMi and YALMIP optimization packages. As an example and not a limitation, a time-reversed Van der Pol ("TRVDP") dynamical control system was utilized to simulate a control system. In practice, the dynamical control system may represent a vehicle control system, or sub-systems of the vehicle control system, for example. The TRVDP system was defined by the following nonlinear differential equations:

$$\begin{bmatrix} \dot{x}_1 \\ \dot{x}_2 \end{bmatrix} = \begin{bmatrix} -x_2 \\ x_1 + (x_2^2 - 1)x_2 \end{bmatrix}. \quad (5)$$

Figure 3:
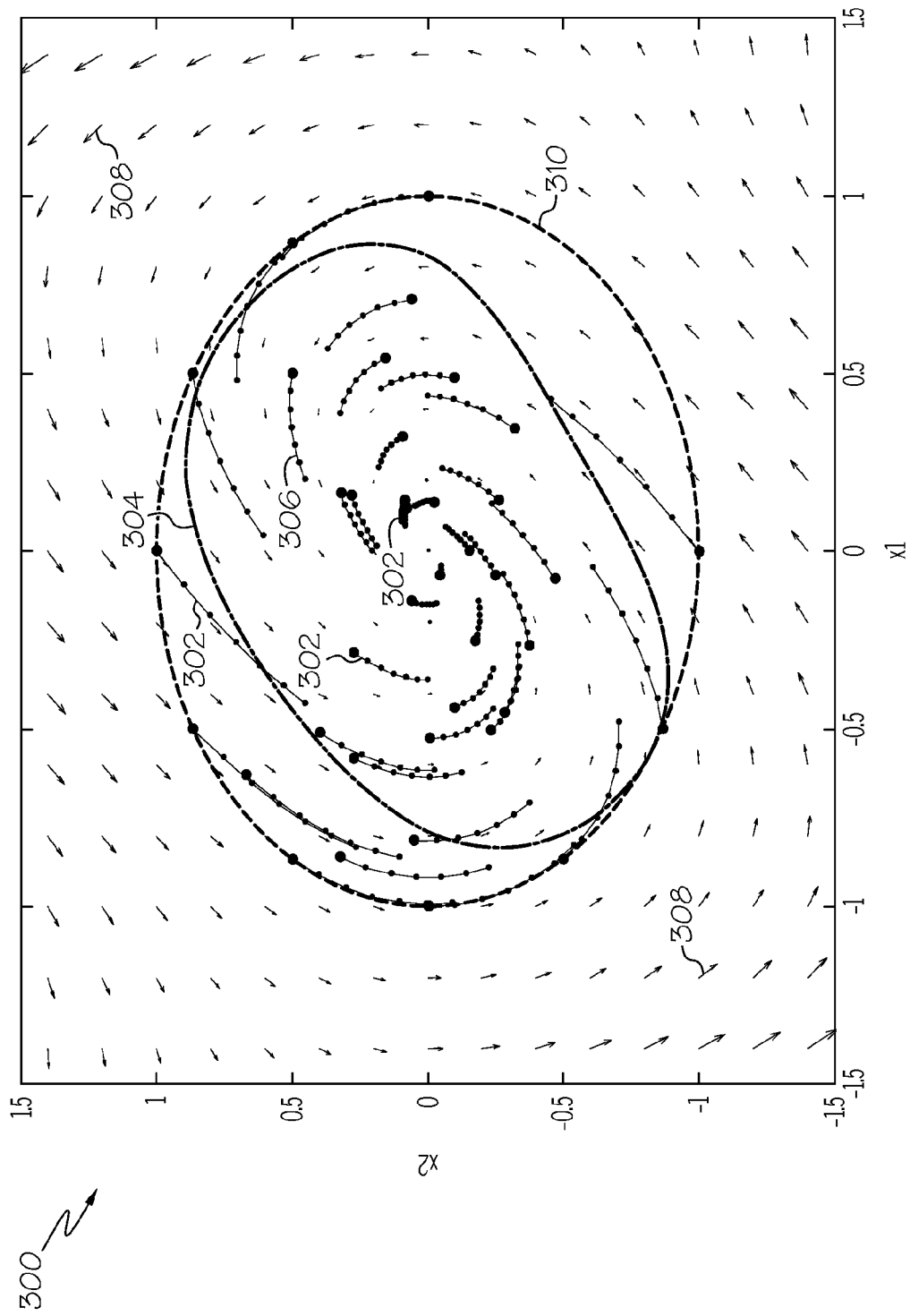
FIG. 3 graphically depicts results of simulations using the process depicted in FIG. 2 and a time-reversed Van der Pol dynamical control system as described and illustrated herein.

The process depicted in FIG. 2 was performed on the TRVDP system. FIG. 3 depicts the results 300. The large circle 310 represents the region of interest for the analysis problem. The small arrows 308 indicate the direction of the vector field as dictated by the above differential equations. Trace 306 represents the initial set of trajectories from FIG. 2. It is noted that there is only one initial trajectory in this case, which was manually selected. In many cases, many initial trajectories may be used. Traces 302 represent discovered trajectories that were added automatically by the global optimizer (block 210 of FIG. 2) in attempts to refute the candidate Lyapunov functions. The initial parameters of each trajectory are indicated by a dark dot located at the beginning of each trajectory. It is noted that traces 302 represent the set of discovered trajectories and any counterexample trajectories that were found by the global optimizer. For this example, the semidefinite programming solver module (block 204 of FIG. 2) was visited twice. In other words, one or more counterexamples were found after a first cycle, and no counterexamples that violate the Lyapunov conditions were found after the second cycle.

The oval-shaped line 304 represents the bounds of an invariant set for the system, which was the result of the analysis for this example using the TRVDP system. The invariant set was verified numerically as a proper invariant set for the system (i.e., no traces that enter the invariant set will ever leave the invariant set) using the sum-of-squares technique. The invariant set may provide a powerful analysis tool for the TRVDP system as it allows one to characterize the infinite set of behaviors that the TRVDP system (or any other system) can exhibit.

The invariant set may be referred to after the software code is embedded into the control system during the testing and evaluation stage. For example, experiments may be run to collect experimental data that confirm that the invariant set that was determined by simulation is in fact a true invariant set. This may provide a high degree of confidence that the software code is stable when deployed in the dynamical control system. In such a manner, the simulations may be used to perform the stability analysis of the software code. Experimental trajectories may also be input into the semidefinite programming solver module along with the initial set of trajectories and the discovered trajectories to further evaluate the software code.

It should now be understood that embodiments described herein provide for a simulation-based technique to identify Lyapunov functions for system designs, which may be applied late in a MBD process (e.g., at the calibration or unit testing phases). Embodiments employ efficient semidefinite programming techniques, which are computationally tractable, even for complex system designs. Embodiments may be utilized to automatically identify undesirable system behaviors, such as those caused by software bugs.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of evaluating stability of software code for a control system, the method comprising:
  receiving a set of initial trajectories;
  determining, by a semidefinite programming solver module, one or more candidate Lyapunov functions based on the set of initial trajectories;
  performing a plurality of simulations using a model of the control system to create a set of discovered trajectories; and
  evaluating the set of discovered trajectories to determine one or more counterexample trajectories that violate one or more Lyapunov conditions, wherein if one or more counterexample trajectories are discovered:
    inputting the set of discovered trajectories including the one or more counterexample trajectories into the semidefinite programming solver module; and
    determining, by the semidefinite programming solver module, one or more additional candidate Lyapunov functions based on the set of initial trajectories and the set of discovered trajectories.

2. The method of claim 1, further comprising, if no candidate Lyapunov functions are found, indicating instability of the software code.

3. The method of claim 1, further comprising, if no counterexample trajectories are discovered, indicating stability of the software code.

4. The method of claim 1, wherein the set of initial trajectories comprise simulated trajectories and/or experimental trajectories.

5. The method of claim 1, further comprising, if no counterexample trajectories are discovered, performing a convex optimization on the set of initial trajectories and the set of discovered trajectories to determine an invariant set of trajectories.

6. The method of claim 5, wherein the convex optimization is provided by the sum-of-squares technique.

7. The method of claim 5, further comprising:
  executing the software code in the control system to obtain experimental data; and
  comparing the experimental data to the invariant set of trajectories.

8. The method of claim 1, wherein the set of discovered trajectories are evaluated to determine the one or more counterexample trajectories by a non-convex, global optimization process.

9. The method of claim 1, wherein the model of the control system is a continuous state-space model.

10. The method of claim 1, further comprising:
  executing the software code in the control system to obtain experimental trajectories; and
  inputting the experimental trajectories into the semidefinite programming solver module to determine one or more candidate Lyapunov functions.

11. A computer-program product for use with a computing device for evaluating stability of software code for a control system, the computer-program product comprising:
  a non-transitory computer-readable medium storing computer-executable instructions that, when executed by the computing device, cause the computing device to:
    receive a set of initial trajectories;
    determine one or more candidate Lyapunov functions based on the set of initial trajectories using a semidefinite programming solver module;
    perform a plurality of simulations using a model of the control system to create a set of discovered trajectories; and
    evaluate the set of discovered trajectories to determine one or more counterexample trajectories that violate one or more Lyapunov conditions, wherein, if one or more counterexample trajectories are discovered, the computer-executable instructions further cause the computing device to:
      input the set of discovered trajectories including the one or more counterexample trajectories into the semidefinite programming solver module; and
      determine one or more additional candidate Lyapunov functions based on the set of initial trajectories and the set of discovered trajectories.

12. The computer-program product of claim 11, wherein if no candidate Lyapunov functions are found, the computer-executable instructions cause the computing device to indicate instability of the software code.

13. The computer-program product of claim 11, wherein if no counterexample trajectories are discovered, the computer-executable instructions cause the computing device to indicate stability of the software code.

14. The computer-program product of claim 11, wherein the set of initial trajectories comprise simulated trajectories and/or experimental trajectories.

15. The computer-program product of claim 11, wherein if no counterexample trajectories are discovered the computer-executable instructions cause the computing device to perform a convex optimization on the set of initial trajectories and the set of discovered trajectories to determine an invariant set of trajectories.

16. The computer-program product of claim 15, wherein the convex optimization is provided by the sum-of-squares technique.

17. The computer-program product of claim 11, wherein the set of discovered trajectories are evaluated to determine the one or more counterexample trajectories by a non-convex, global optimization process.

18. The computer-program product of claim 11, wherein the software code is for one or more vehicle systems.

19. A method of evaluating stability of software code for a control system, the method comprising:
- receiving a set of initial trajectories;
- determining, by a semidefinite programming solver module, one or more candidate Lyapunov functions based on the set of initial trajectories;
- performing a plurality of simulations of the control system to create a set of discovered trajectories; and
- evaluating the set of discovered trajectories to determine one or more counterexample trajectories that violate one or more Lyapunov conditions, wherein:
  - if no candidate Lyapunov functions are found, indicating instability of the software code;
  - if one or more counterexample trajectories are discovered:
    - inputting the set of discovered trajectories including the one or more counterexample trajectories into the semidefinite programming solver module; and
    - determining, by the semidefinite programming solver module, one or more additional candidate Lyapunov functions based on the set of initial trajectories and the set of discovered trajectories; and
  - if no counterexample trajectories are discovered, performing a convex optimization on the set of initial trajectories and the set of discovered trajectories to determine an invariant set of trajectories.

20. The method of claim 19, wherein the software code is for one or more vehicle systems.

* * * * *

UNITED STATES PATENT AND TRADEMARK OFFICE
CERTIFICATE OF CORRECTION

PATENT NO. : 9,195,222 B2
APPLICATION NO. : 13/760407
DATED : November 24, 2015
INVENTOR(S) : Kapinski et al.

It is certified that error appears in the above-identified patent and that said Letters Patent is hereby corrected as shown below:

In Title Page Item (73) Assignee: Toyota Motor Engineering & Manufactruing North America, Inc., please change "Manufactruing" to -- Manufacturing --.

In Title Page Item (56) Other Publications (Page 2, Column 2): delete "Loferg, Johan, YALMPI: A toolbox for modeling and optimization in MATLAB. In Proceedings of the CACSD Conference, Taipei, Taiwan, 2004." and insert -- Loferg, Johan, YALMIP: A toolbox for modeling and optimization in MATLAB. In Proceedings of the CACSD Conference, Taipei, Taiwan, 2004. -- therefor.

Signed and Sealed this
Eighth Day of March, 2016

Michelle K. Lee
*Director of the United States Patent and Trademark Office*